(12) United States Patent
Sun et al.

(10) Patent No.: US 8,452,958 B2
(45) Date of Patent: May 28, 2013

(54) DETERMINING CERTIFICATE REVOCATION STATUS

(75) Inventors: Yixin Sun, San Ramon, CA (US);
Puneet Gupta, Milpitas, CA (US);
Robert Stuercke, Broomfield, CO (US);
Bryan Kerrigan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 12/873,169

(22) Filed: Aug. 31, 2010

(65) Prior Publication Data

US 2012/0054487 A1   Mar. 1, 2012

(51) Int. Cl.
*H04L 29/00* (2006.01)

(52) U.S. Cl.
USPC ............ 713/158; 713/155; 713/156; 713/157

(58) Field of Classification Search
USPC .................................. 713/155–158
See application file for complete search history.

(56) References Cited

U.S. PATENT DOCUMENTS

| | | | |
|---|---|---|---|
| 2003/0126433 A1* | 7/2003 | Hui | 713/158 |
| 2005/0228998 A1* | 10/2005 | Chan et al. | 713/175 |
| 2007/0036359 A1* | 2/2007 | Suzuki | 380/270 |

* cited by examiner

*Primary Examiner* — Ghazal Shehni
(74) *Attorney, Agent, or Firm* — Hickman Palermo Truong Becker Bingham Wong LLP

(57) ABSTRACT

A method is disclosed for obtaining certificate revocation information from a server, obtaining from a client a request for a revocation status of a certificate and notifying the client when the certificate identified in the client request has been revoked. The method may be performed by a networking device that is separate from the server and the client.

20 Claims, 4 Drawing Sheets

DETERMINING CERTIFICATE REVOCATION STATUS

TECHNICAL FIELD

The present disclosure generally relates to the management of security credentials on a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A certificate authority (CA) in a network issues and manages security credentials and public keys form message encryption. As part of a public key infrastructure (PKI), a CA checks with a registration authority (RA) to verify information provided by the requestor of a digital certificate. When a certificate is issued, it is expected to be in use for its entire validity period, i.e., until its expiration date is reached. However, various circumstances may cause a certificate to become invalid prior to the expiration of the validity period. Under such circumstances, the CA needs to revoke the certificate. Revocation of a certificate may be accomplished through the use of a certificate revocation list (CRL). When a certificate is revoked the CA may add an identifier associated with the certificate to the CRL.

DETAILED DESCRIPTION

Determining certificate revocation status is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Determining Certificate Revocation Status
4.0 Implementation Mechanisms—Hardware Overview
5.0 Extensions and Alternatives
1.0 General Overview In an embodiment, certificate revocation information may be obtained from a server computer, such as a certificate revocation list (CRL) server or a certificate authority (CA) server, and the certificate information may be stored in a first database. Further, a request from a client for the revocation status of a certificate may be obtained and a determination whether the certificate revocation information received from the server identifies the certificate may be made based on the first database and without contacting the server. If the certificate revocation information identifies the certificate, the client may be notified that the certificate has been revoked.

In an embodiment, status request information that indicates that the client requested the revocation status of the certificate may be persistently stored in a second database. In some embodiments, the determination that the certificate revocation information identifies the certificate may be based at least in part on the second database. In some embodiments, in response to determining that the certificate revocation information does not identify the certificate, the certificate may be added to the second database in association with information that identifies the client. In some embodiments, certificate revocation information may be periodically requested from the server according to a time interval.

According to some embodiments, the certificate revocation information received at the service may include only certificate revocation information that has not been previously received from the server. In an embodiment, the certificate revocation information may include a certificate revocation list. In another embodiment, the certificate revocation information may identify only certificates that have not been identified in previously obtained certificate revocation information. According to some embodiments, the client's request may comprise only the minimum necessary information to identify one or more certificates.

In other embodiments, the invention encompasses a computer apparatus and a computer-readable medium configured to carry out the foregoing steps.

2.0 Structural and Functional Overview

Figure 1:
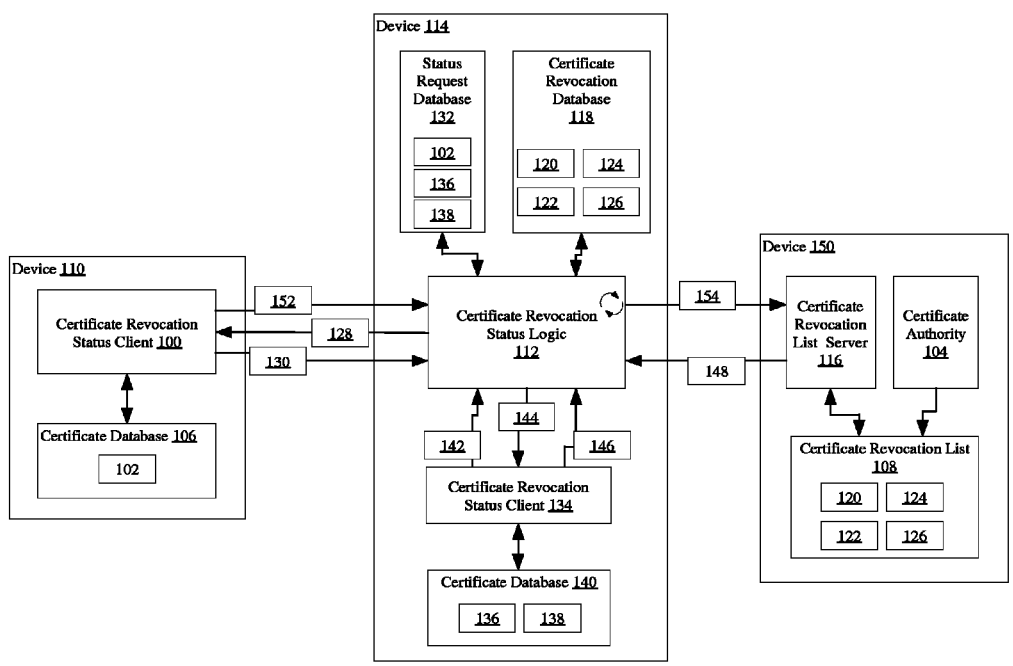
FIG. 1 illustrates a computer system that may employ certificate revocation status logic.

FIG. 1 illustrates a computer system that may employ certificate revocation status logic. In an embodiment, client 100 hosted by device 110 may have received a certificate 102 from a certificate holder. For example, client 100 may communicate with other entities on a network using encrypted communications. For example, client 100 may be a VPN (virtual private network) concentrator on the network that processes GETVPN requests. The concentrator may require certificate holders, such as VPN clients, to provide a valid certificate granted by a particular certificate authority before allowing VPN clients access to the network. When the certificate holder attempts to utilize a service provided by client 100, the certificate holder may provide to client 100 a certificate granted to the certificate holder by certificate authority (CA) 104 in order to access a service provided by client 100 or to facilitate encrypted communications between the certificate holder and client 100. Client 100 may store certificate 102 in certificate database 106, according to some embodiments.

In some embodiments, client 100 may need to validate certificate 102 when the certificate is received from the certificate holder. For example, upon receipt of a certificate and before establishing a VPN session, a VPN concentrator may query a certificate revocation list (CRL) 108 to determine if certificate 102 provided by a VPN client has been revoked.

In some circumstances, a certificate may become invalid before the expiration date of the certificate. Thus, if a VPN concentrator only checks the validity of a VPN client's certificate before establishing a VPN session and fails to check the validity of the certificate during the session, the VPN client's certificate may be revoked by the certificate authority during the session but the VPN concentrator will not know of the revocation. The VPN concentrator may be allowing an unauthorized VPN client access to the VPN network. To prevent unauthorized access after an initial certificate validity check, client 100 may periodically check CRL 108 during the lifetime of certificate 102 by sending a CRL fetching request to retrieve the CRL list from the CA server or CRL server to determine if the certificate 102 is found in that list and should no longer be relied upon. However, periodically checking, or polling, the certificate revocation list may be a computational expensive operation from the client's perspective, particularly for devices such as a GETVPN key server, or DMVPN (dynamic multipoint virtual private network) head-end device, which may have to keep track of hundreds or thousands of certificates it receives. Repeated polling also may consume excessive network bandwidth by introducing multiple polling messages into the network.

In some embodiments, a certificate revocation status service may be provided to perform certificate revocation status services for clients, such as a VPN concentrator or VPN key server, and to notify clients when a certificate has been revoked by a certificate authority. Thus, clients do not incur the burden of periodically polling a certificate revocation list server or certificate authority to determine the revocation status of certificates.

According to embodiments, certificate revocation status logic 112 may be hosted on device 114. Client 100 may be a certificate revocation status client, according to embodiments. In some embodiments, client 100 may request the revocation status of a certificate from logic 112.

In an embodiment, logic 112 may obtain a certificate revocation status request 152 from client 100 for the revocation status of certificate 102. Request 152 may include certificate status request information that identifies certificate 102 and associates the certificate with client 100. In some embodiments, the client's status request may include only the minimum necessary information for identifying certificate 102. For example, the minimum necessary information may include an identifier for certificate 102 rather than the entire certificate. Alternatively, the minimum necessary information may be a combination of a certificate identifier and an issuer identifier or certificate authority identifier. In some embodiments, the minimum necessary information may be hashed to create an identifier for a certificate. Upon receipt of the request, logic 112 may send an acknowledgement message back to client 100 acknowledging the receipt of the client's request.

Logic 112 may compare the certificate status request information received in the request to certificate revocation information stored in certification revocation database 118 to determine if certificate 102 has been revoked. For example, database 118 may store certificate revocation list information that has been previously obtained from one or more certificate revocation list servers, such as CRL server 116 or CA server 104 hosted on device 150. The certificate revocation list information may identify one or more revoked certificates, for example, certificates 120, 122, 124 and 126, which were revoked by CA server 104 and identified in certificate revocation list 108.

In an embodiment, if logic 112 determines that database 118 identifies certificate 102, the logic may notify client 100 that certificate 102 has been revoked. For example, if logic 112 determines that certificate 102 matches certificate 122, revocation status notification message 128 may be sent to client 100 to notify the client that certificate 102 has been revoked by CA server 104. Thus, embodiments implement a push process of actively providing revocation data to clients and clients do not perform periodic polling. In an embodiment, client 100 may acknowledge receipt of notification message 128 by sending logic 112 acknowledgement message 130.

In some embodiments, logic 112 may determine that certificate 102 is not identified in database 118. Logic 112 may store certificate status request information that identifies certificate 102 in status request database 132. In an embodiment, the certificate status request information in database 132 may be used by logic 112 to determine whether certificate 102 has been revoked by comparing the information in the database to certificate revocation information in database 118 after the client's request is received. In some embodiments, the determination whether certificate 102 has been revoked is made based on the client certificate status request information before the request information is stored in database 132.

In various embodiments, certificate revocation information is received from certificate revocation list server 116, certificate authority 104, certificate revocation list 108, or any combination thereof, and may include one or more certificates or one or more identifiers that uniquely identify one or more certificates. Certificate revocation information may include all of the data or a subset of the data transmitted in message 148, discussed further below. In various embodiments, certificate status request information is received from one or more clients that are interested in the revocation status of one or more certificates and may include one or more certificates, one or more identifiers that uniquely identify one or more certificates, a client identifier associated with each certificate for each client that has requested certificate revocation status, a method for communicating with the client, or any combination thereof. Certificate status request information may include all of the data or a subset of the data transmitted in message 152, discussed above.

In some embodiments, a client may be hosted on the same device as the certificate revocation status logic 112. For example, certificate revocation status client 134 may be co-hosted on device 114 along with logic 112. Client 134 may have received one or more certificates from one or more certificate holders. For example, client 134 may have received certificates 136, 138 and stored the certificates in client certificate database 140 on device 114. In an embodiment, client 134 may request the revocation status of certificates 136, 138 from logic 112 via certificate status request message 142. Logic 112 may check database 118 to determine whether certificates 136, 138 matches any of certificates 120, 122, 124, 126. If a match is found, logic 112 may send revocation status notification message 144 to client 134 that identifies which certificate, certificate 136, 138, or both, has been revoked. When client 134 receives message 144, client 134 may send acknowledgement message 146 to logic 112 acknowledging the receipt of the revocation status notification message. If logic 112 does not receive an acknowledgement message from client 134 within a specified period of time, logic 112 may resend message 144.

In an embodiment, certificate 136 or certificate 138 may not match the certificate revocation information stored in database 118. If no match is found, certificate status request information identifying certificate 136, 138 may be stored in database 132 to be compared to the certificate revocation information stored in database 118 as the database is updated from CRL 108. For example, logic 112 may periodically request certificate revocation information from CRL server 116 or certificate authority server 104 via message 154. Server 116 or server 104 may transmit certificate revocation information message 148 to logic 112. Logic 112 may update database 118 based on the certificate revocation information contained within message 148.

In some embodiments, certificate revocation information message 148 may identify all certificates identified in CRL 108. In an embodiment, certificate revocation information message 148 may identify only the certificates that have been revoked since the last certificate revocation information message was sent to logic 112. For example, logic 112 may periodically request certificate revocation information from CRL server 116 or CA server 104. The first time logic 112 requests certificate revocation information, server 116, or server 104, may send a list of all certificates identified in CRL 108. Logic 112 may populate database 118 based on the information in the list that identifies all certificates. On subsequent requests for the certificate revocation information from logic 112, server 116 or 104 may only send updates to the certification revocation list. For example, the updates may identify only the certificates that have been revoked since the last update. Logic 112 may then update database 118 based the received update information.

In some embodiments, logic 112 may be capable of servicing certificate revocation status requests from a plurality of clients hosted on a plurality of devices. In some embodiments, logic 112 may be capable of requesting certificate revocation information from a plurality of servers hosted on a plurality of devices. In an embodiment, database 118 may store certificate revocation information from only a single certificate revocation list. In other embodiments, database 118 may store certificate information from a plurality of certificate revocation lists generated by a plurality of certificate authorities.

3.0 Determining Certificate Revocation Status

Figure 2:
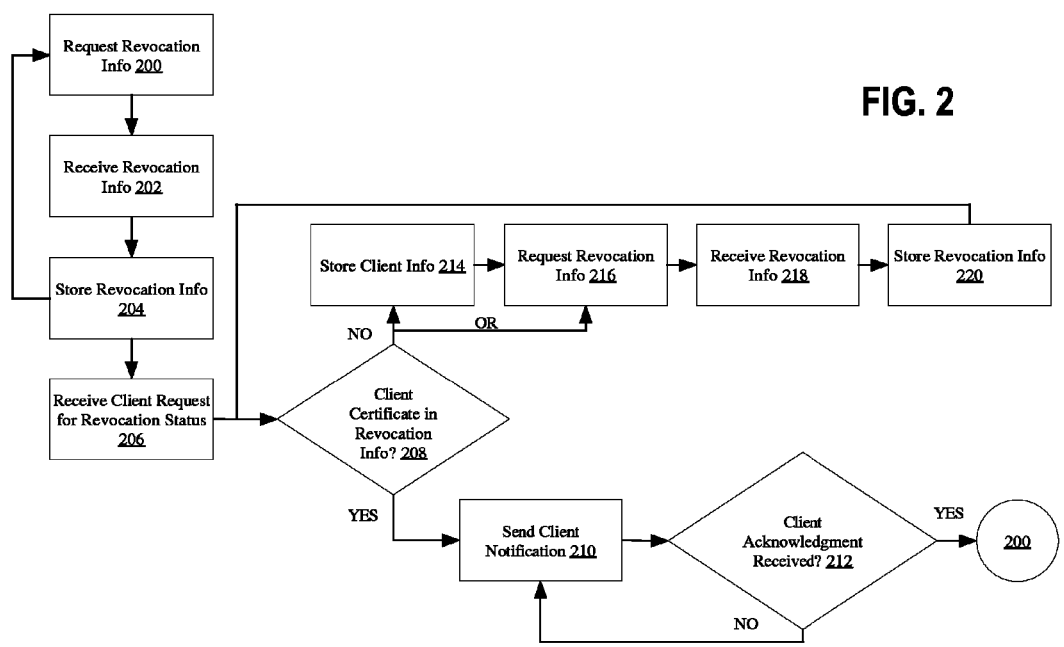
FIG. 2 illustrates determining certificate revocation status.

FIG. 2 illustrates determining certificate revocation status. In an embodiment, logic 112, discussed above, may be configured to perform the method described herein.

At step 200, a request for certificate revocation information may be sent to a server hosting a certificate revocation list, according to an embodiment. For example, certificate revocation status logic 112 may request certificate revocation information from certificate authority server 104 or certificate revocation list server 116.

According to some embodiments, at step 202, the requested certificate revocation information may be received. For example, logic 112 may receive certificate revocation information from CA server 104 or CRL server 116. The certificate revocation information may indicate that one or more certificates have been revoked, placed in a hold status, or reinstated from the hold status. For example, a hold status is a reversible status used to note the temporary invalidity of the certificate.

At step 204, the received certificate revocation information may be stored, according to an embodiment. For example, the received certificate revocation information may be persistently stored in a certificate revocation database 118 so that when a client requests the revocation status of a particular certificate logic 112 may determine if the particular certificate has been revoked based on the information in database 118. Database 118 may store certificate revocation information identifying one or more certificates, including the hold or revoked status of each certificate. The database may store certificate revocation information received from a single certificate revocation list or may include certificate revocation information collected from a plurality of certificate revocation lists. According to some embodiments, after step 204, step 200 may be performed after a specified period of time has elapsed.

At step 206, a request for the revocation status of a certificate may be received from a client, according to an embodiment. For example, logic 112 may receive a request for the revocation status of a particular certificate. Although FIG. 2 illustrates an embodiment where a client request is received after step 204 is performed, a client request is not necessarily received after step 204. For example, a client request, or multiple client requests, may be received before, during or after any of steps 200-220 of FIG. 2. In some embodiments, at step 208, after receiving the request from the client, logic 112 may determine whether the certificate identified by the client request is identified in certificate revocation database 118. For example, the client request may include one or more identifiers that uniquely identify one or more certificates. Logic 112 may compare the identifiers received in the client request to one or more identifiers in certification revocation database 118 to determine whether the certificates identified by the client have been revoked.

If a certificate identified in the client's status request is found in database 118, at step 210 the client may be notified that the certificate's status has changed. In an embodiment, database 118 may contain information indicating that the requested certificate is revoked. For example, logic 112 may determine based on the certificate revocation database that the certificate identified by the client has been revoked. In some embodiments, database 118 may contain information indicating that the requested certificate has a hold status or that the certificate has been reinstated from a hold status and is valid again. Logic 112 may then send a message to the client to notify the client that the certificate has been revoked, placed on hold, or reinstated. If the client receives the notification message the client may respond by sending to logic 112 an acknowledgement message acknowledging receipt of the notification message.

At step 212, it may be determined whether a notification acknowledgement message has been received from the client, according to some embodiments. For example, logic 112 may determine whether a notification acknowledgement message has been received from the client within a specified period of time. If the period of time has elapsed without receipt of an acknowledgement message, then step 210 may be performed again to retransmit the certification revocation notification message to the client.

If, at step 212, a notification acknowledgement message has been received, the method may be continued at step 200. For example, logic 112 may continue obtaining certificate revocation status information from the certificate authority server or certificate revocation list server in order to process additional requests from clients. Additionally, once the certificate revocation status logic 112 receives a notification acknowledgement message, logic 112 may remove the certificate revocation status request information associated with the revoked certificate from status request database 132.

Referring again to step 208, if it is determined that none of the certificates identified in the client's certificate status request are identified in certificate revocation database 118, the client request information may be stored at step 214. For example, the client request information may include information that uniquely identifies one or more certificates. The client request information may also include an identifier for the client, such as a MAC address or IP address, and a method for communicating with the client, such as by secure socket layer messaging. Additionally, the client request information may be persistently stored in status request database 132 for comparison to the certificate revocation information stored in the certification revocation database 118 as the database is updated.

After the client request information is stored at step 214, certificate revocation status information may be requested from a server at step 216, according to an embodiment. Step 216, as well as step 200, may be performed according to a specified time interval, according to embodiments. For example, at step 216, like step 200, certificate revocation status logic 112 may request certificate revocation status information from a certificate authority server or a certificate revocation list server. Step 216 may be performed after a specified period of time has elapsed since performing step 200, according to embodiments.

At step 218, certificate revocation information may be received, according to an embodiment. For example, similar to step 202, at step 218 certificate revocation status logic 112 may receive the requested certificate revocation information from certificate authority server 104 or certificate revocation list server 116. At step 220, the received certificate revocation information may be stored, according to embodiments. For example, at step 220, like step 204, the certificate revocation information may be persistently stored in certificate revocation database 118. In some embodiments, the certificate revocation information includes an entire certificate revocation list. Thus, at step 220, storing the certificate revocation information may include replacing the certificate revocation information in certificate revocation database 118. Alternatively, the received certificate revocation information may identify only the certificates that have been revoked since the last certificate revocation information was received. Thus, at step 220, storing the certificate revocation information may include adding certificate revocation information to the certificate revocation database to identify the recently revoked certificates.

At step 208, after the certificate revocation information is stored, it may be determined whether the certificate identified by the client request is identified in the certificate revocation database, according to embodiments. For example, certificate revocation status logic 112 may determine whether client certificate revocation status request information stored in the status request database 132 identifies any certificates identified in the updated certificate revocation database 118. If the any of the certificates identified in the client request are identified in certificate revocation database 118, the method may proceed to step 210, as described above. If the certificate identified by the client request is not identified in certificate revocation database 118, the method may proceed to step 216, described above. In some embodiments the certificate revocation status determination at step 208 may be performed after the certificate revocation status information is received and before storing the certificate revocation status information in certificate revocation database 118.

In some embodiments, certificate revocation status logic 112 may not begin requesting certificate revocation status information from the certificate authority server or certificate revocation list server until after receipt of the first client certificate revocation status request. Thus, the method illustrated by FIG. 2 may begin at step 206. For example, the certificate revocation status logic may not start sending requests to the CA server or CRL server until after the first client certificate revocation status request. Additionally, certificate status request logic 112 may stop sending requests to the servers once all of the certificates identified in pending client requests have been revoked, according to some embodiments. Thus, because revoked certificates that have been reported to a client and acknowledged by the client may be removed from status request database 132, according to some embodiments, logic 112 may stop making requests to the certificate revocation list server or the certificate authority server once status request database 132 no longer identifies any certificates.

Figure 3:
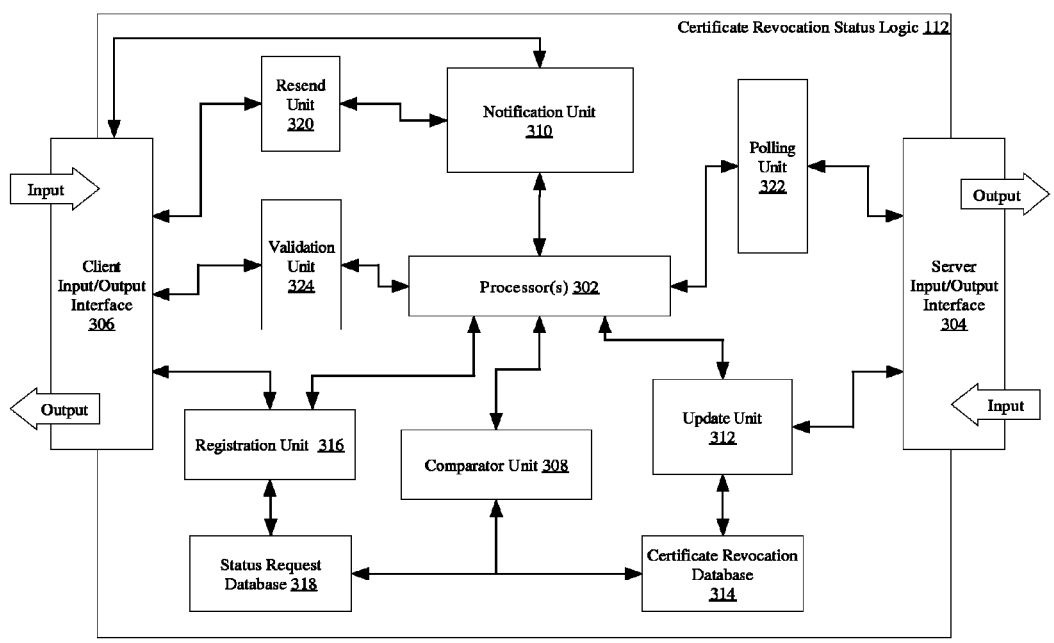
FIG. 3 illustrates a certificate revocation status service.

FIG. 3 illustrates certificate revocation status logic 112. In an embodiment, certificate revocation status logic 112 may include one or more processors 302, server interface 304, client interface 306, comparator unit 308 and notification unit 310. In various embodiments, certificate revocation status logic 112 may also include polling unit 322, update unit 312, certificate revocation database 314, status request database 318, registration unit 316, resend unit 320 or validation unit 324.

Server interface 304 may be configured to receive certificate revocation information from a server, in an embodiment. For example, server interface 304 may receive certificate revocation information from certificate revocation list server 116 or certificate authority 104. Upon receipt of the certificate revocation information, server interface 304 may send the certificate revocation information to certificate information update unit 312 for further processing, according to some embodiments.

Additionally, server interface 304 may be configured to transmit requests for certificate revocation information to a server, according to embodiments. For example, polling unit 322 may cause server interface 304 to send certificate revocation list server 116 or certificate authority server 104 a request for certificate revocation information.

Certificate information update unit 312 may be configured to persistently store in certificate revocation database 314 the certificate revocation information received by server interface 304, according to an embodiment. For example, certificate information update unit may receive certificate revocation information from server interface 304 that includes a complete listing of all certificates that have been revoked by certificate authority 104. Upon receiving the certificate revocation information, certificate information update unit 302 may store the complete certificate revocation listing in database 314, according to embodiments. Certificate information update unit 302 may store the certificate revocation information either by adding the information to database 314 or by replacing the contents of database 314 with the contents of the certificate revocation information. Alternatively, certificate information update unit 312 may receive certificate revocation information that includes a partial listing of certificates that have been revoked by certificate authority 104. In an embodiment, the partial listing may include only the certificates that have been revoked since the last certificate revocation information was received at server interface 304.

Certificate revocation database 314 may persistently store certificate revocation information received by server interface 104, according to embodiments. The certificate revocation information stored in database 314 may include data typically included certificate revocation lists, such as the state of revocation, for example, revoked or hold, of a certificate and the certificate serial number. Database 314 may store certificate revocation information from a single certificate revocation list or may include information from a plurality of certificate revocation lists. The certificate revocation information stored in database 314 may be received from a single server, such as a certificate authority server or a certificate revocation list server, or from a plurality of servers. Database 314 may also store information identifying the certificate authority, such as an issuer identifier, that granted the certificates identified in the certificate revocation information stored in database 314, according to some embodiments.

Client interface 306 may be configured to receive one or more certificate revocation status requests from one or more clients, according to embodiments. The received certificate revocation status request may include one or more certificate identifiers that uniquely identify one or more certificates. The client certificate revocation status request may also include a client identifier associated with each certificate and a method for communicating with the client that sent the request. Client interface 306 may transmit the client certificate revocation status request to registration unit 316 for further processing.

Client interface 306 may be configured to send certificate revocation notification messages to certificate revocation status clients, according to embodiments. For example, notification unit 310 or resend unit 320 may transmit certificate revocation notification messages to clients through client interface 306. Additionally, client interface 306 may be configured to receive notification acknowledgement messages from clients, according to embodiments.

Registration unit 316 may store the certificate status request information received from client interface 306 in status request database 318, according to embodiments. In an embodiment, before registration unit 316 stores the certificate status request information in database 318, the registration unit may transmit the certificate status request information, including the certificate identifiers, to comparator unit 308 for comparison to the certificate revocation information stored in database 314. In some embodiments, registration unit 316 may store the certificate status request information in status request database 318 before comparator unit 308 performs the comparison.

Status request database 318 may store certificate status request information received from one or more clients, according to embodiments. Database 318 may store information that identifies one or more certificates for which revocation status is requested. Database 318 may also store information that identifies a client corresponding to each certificate, information that identifies the certificate authority that granted each identified certificate, or information that identifies a certificate revocation list server for retrieving certificate revocation status information. The information stored in database 318 that identifies the client, certificate authority or certification revocation list server may include an internet protocol address, MAC address, domain name, or any other data that may provide a method for communicating with or locating the client, certificate authority or certificate revocation list server. In some embodiments, the information stored in status request database 318 may be used to query the certificate revocation database 314 to determine whether a certificate identified in the status request database is identified in the certificate revocation database.

Comparator unit 308 may compare the certificate identifiers included in the client request, or stored in status request database 318, to the certificate identifiers stored in certificate revocation database 314, according to embodiments. In some embodiments, if comparator unit 308 determines that certificates identified in status request database 318 match certificates identified in certificate revocation database 314, comparator unit 308 may indicate to notification unit 310 that a revoked certificate has been identified.

Notification unit 310 may receive an indication from comparator unit 308 that a revoked certificate has been identified among the certificates identified in database 318, according to embodiments. In response, notification unit 310 may send, via client interface 306, a notification to the client associated with the revoked certificate in the status request database. For example, status request database 318 may store an association between a certificate and a client identifier for a client that requested the certificate revocation status of the revoked certificate. Notification unit 310 may use the client identification information, such as IP address, MAC address or other identifier that uniquely identifies the client, stored in database 318 to communicate the certificate revocation status notification to the client, according to embodiments. Communication with the client may be performed according to a communication method associated with the client and identified in database 318. For example, communication with the client may be performed in a secure manner, as provided by validation unit 324 or according to an unsecure protocol.

Resend unit 320 may monitor client interface 306 for receipt of a notification acknowledgement messages from certificate revocation status clients, according to embodiments. For example, when a client is sent a notification message indicating that a certificate has been revoked, resend unit 320 may be configured to monitor client interface 306 for a specified period of time for an acknowledgement message from the client that acknowledges receipt of the notification message. If an acknowledgement message is not received within the specified period of time, resend unit 320 may cause the certificate revocation notification message to be resent to the client. According to some embodiments, resend unit 320 may resend the notification message itself or resend unit 320 may cause notification unit 310 to resend the notification message.

Polling unit 322 may be configured to cause server interface 304 to send a request for certificate revocation information to a server, according to embodiments. For example, polling unit 322 may be configured to request certificate revocation information according to a time interval. If the time interval is two days, for example, polling unit may cause server interface 304 to send a certificate revocation information request to certificate revocation list server 116 or certificate authority 104 every two days.

Validation unit 324 may be configured to provide secure communications between a certificate revocation status client and the certificate revocation status logic. For example, certificate revocation status logic 112 and client 100 may exchange their own certificates to sign and validate the messages exchanged between them. Logic 112 and client 100 may also protect messages they exchange through the use of a secure socket layer (SSL) transport layer secure (TLS) connection.

The embodiments described herein may reduce the computational burden on applications that currently must periodically query a certificate revocation list server to determine the validity of certificates. For example, instead of performing multiple queries to check the validity of hundreds of certificates, applications may make a single certificate revocation status request to the certificate revocation status logic, according to embodiments described herein. Thus, the application no longer has the burden of the computationally expensive operation of periodically polling the certificate revocation list server to determine the validity of certificates.

Moreover, once the application has requested certificate revocation status from the certificate revocation logic, embodiments described herein may allow the application to simply wait for a revocation notification instead of having to actively check the status of certificates. This may reduce the amount of network traffic related to certificate revocation status requests. For example, if there are 3,000 clients and each client polls the certificate revocation list server for the revocation status of certificates every two days then in one month about 45,000 status requests will have been sent to the certificate revocation list server. In contrast, if the certificate revocation status logic described herein polls every two days for one month only 15 status requests will be sent plus a request from each client for a total of 3,015 request messages thereby reducing the number of status request messages by about ninety-three percent (93%), for example. Thus, by using the certificate revocation status logic described herein, network traffic may be reduced. Also, because fewer requests are made on the certificate request list server, the request processing workload at the certificate revocation list server may be reduced.

Furthermore, the certificate revocation status logic described herein may be able to poll the certificate revocation list server more frequently and thereby reduce the amount of time that an invalid certificate may be used. For example, if a VPN concentrator were to poll the certificate revocation list server for the revocation status of certificates, the VPN concentrator may only be able to poll every five hours because the VPN concentrator performs other operations that may require processing time and resources. On the other hand, the certificate revocation logic described herein may be able to poll more frequently than every five hours. For example, the certificate revocation logic may poll the certificate revocation list server every thirty minutes. Thus, the certificate revocation logic may discover an invalid certificate sooner than the VPN concentrator would. By discovering invalid certificates sooner and notifying the VPN concentrator, the certificate revocation status logic may reduce the duration that an invalid certificate remains in use.

4.0 Implementation Mechanisms—Hardware Overview

Figure 4:
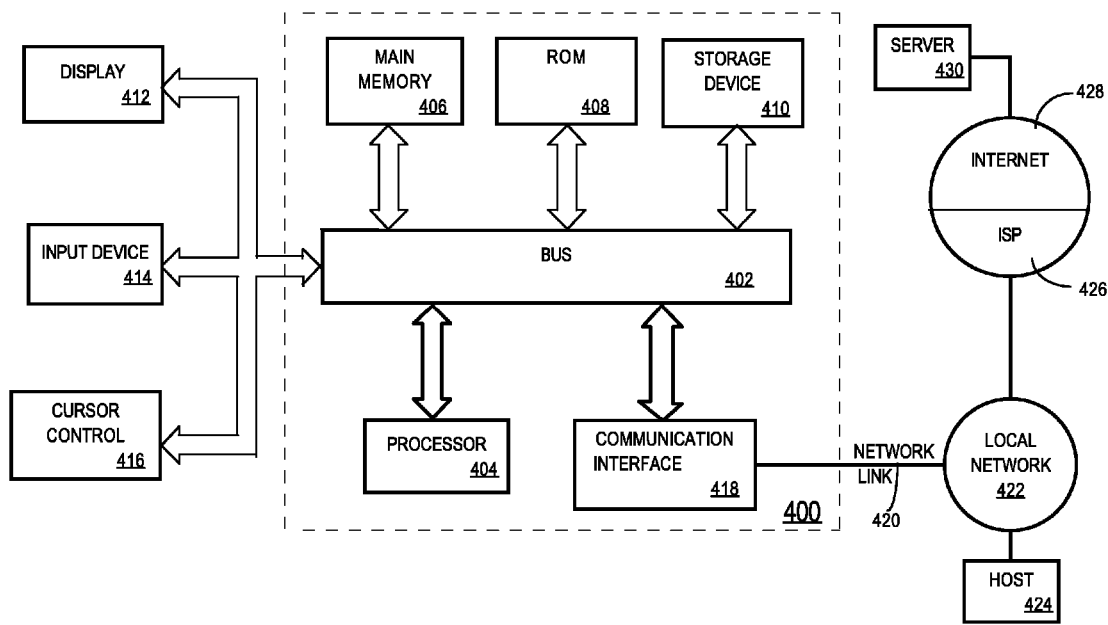
FIG. 4 illustrates a computer system.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during its execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising: obtaining, from a server, certificate revocation information and storing the certificate revocation information in a first database; after checking validity of a certificate, that is in an initiation request to establish a session for a client, and during the session using the already validated certificate:
    obtaining, from the client, a request for a revocation status of the certificate;
    in response to obtaining the request from the client, determining whether the certificate revocation information identifies the certificate based on the first database and without contacting the server, and sending a notification to the client that the certificate is revoked when the certificate revocation information identifies the certificate;
    wherein the method is performed by one or more processors of a networking device that is separate from the server and the client.

2. The method of claim 1, further comprising storing in a second database status request information that indicates that the client requested the revocation status of the certificate, wherein the determination is based at least in part on the second database.

3. The method of claim 1, further comprising, in response to determining that the certificate revocation information does not identify the certificate, adding the certificate to the first database in association with information identifying the client.

4. The method of claim 1, further comprising periodically polling the server to obtain the certificate revocation information according to a time interval.

5. The method of claim 1, further comprising obtaining only certificate revocation information that has not been previously obtained from the server.

6. The method of claim 1, wherein the certificate revocation information includes a certificate revocation list.

7. The method of claim 1, wherein the certificate revocation information identifies only certificates that have not been identified in previously obtained certificate revocation information.

8. The method of claim 1, wherein the request comprises only a threshold amount of certificate identification information.

9. A non-transitory computer-readable storage medium storing one or more sequences of instructions that, when executed by one or more processors, cause the processors to perform:
    obtaining, from a server, certificate revocation information and storing the certificate revocation information in a first database;
    after checking validity of a certificate, that is in an initiation request to establish a session for a client, and during the session using the already validated certificate:
        obtaining, from the client, a request for a revocation status of the certificate;
        in response to obtaining the request from the client, determining whether the certificate revocation information identifies the certificate based on the first database and without contacting the server, and sending a notification to the client that the certificate is revoked when the certificate revocation information identifies the certificate.

10. The non-transitory computer-readable storage medium of claim 9, wherein the instructions comprise instructions that cause storing in a second database status request information that indicates that the client requested the revocation status of the certificate, wherein the determination is based at least in part on the second database.

11. The non-transitory computer-readable storage medium of claim 9, wherein the instructions comprise instructions that cause, in response to determining that the certificate revocation information does not identify the certificate, adding the certificate to the first database in association with information identifying the client.

12. The non-transitory computer-readable storage medium of claim 9, wherein the instructions comprise instructions that cause periodically polling, from the server, the certificate revocation information according to a time interval.

13. The non-transitory computer-readable storage medium of claim 9, wherein the instructions comprise instructions that cause obtaining only certificate revocation information that has not been previously obtained from the server.

14. The non-transitory computer-readable storage medium of claim 9, wherein the certificate revocation information includes a certificate revocation list.

15. The non-transitory computer-readable storage medium of claim 9, wherein the certificate revocation information identifies only certificates that have not been identified in previously obtained certificate revocation information.

16. The non-transitory computer-readable storage medium of claim 9, wherein the request comprises only a threshold amount of certificate identification information.

17. An apparatus comprising:
    one or more processors;
    client interface logic configured to obtain certificate revocation information from a server and store the certificate revocation information in a first database;
    server interface logic coupled to the client interface logic and configured to:
        after checking validity of a certificate, that is in an initiation request to establish a session for a client, and during the session using the already validated certificate:

obtain a request for a certificate revocation status of the certificate from the client;

comparator logic coupled to the server interface logic and configured to determine, in response to obtaining the request from the client, whether the certificate revocation information identifies the certificate based on the first database and without contacting the server;

notification logic coupled to the comparator logic and configured to send the client a notification that the certificate is revoked when the certificate revocation information identifies the certificate.

18. The apparatus of claim 17, further comprising:

a second database;

registration logic configured to persistently store, in the second database, status request information that indicates that the client requested the revocation status of the certificate;

wherein the comparator logic determines that the certificate revocation information identifies the certificate based at least in part on the persistently stored status request information.

19. The apparatus of claim 17, further comprising certificate information update logic configured to add the certificate to the first database in association with information identifying the client in response to the comparator logic determining that the certificate revocation information does not identify the certificate.

20. The apparatus of claim 17, further comprising polling logic configured to periodically poll the server to obtain the certificate revocation information according to a time interval.

* * * * *